Patented Dec. 22, 1936

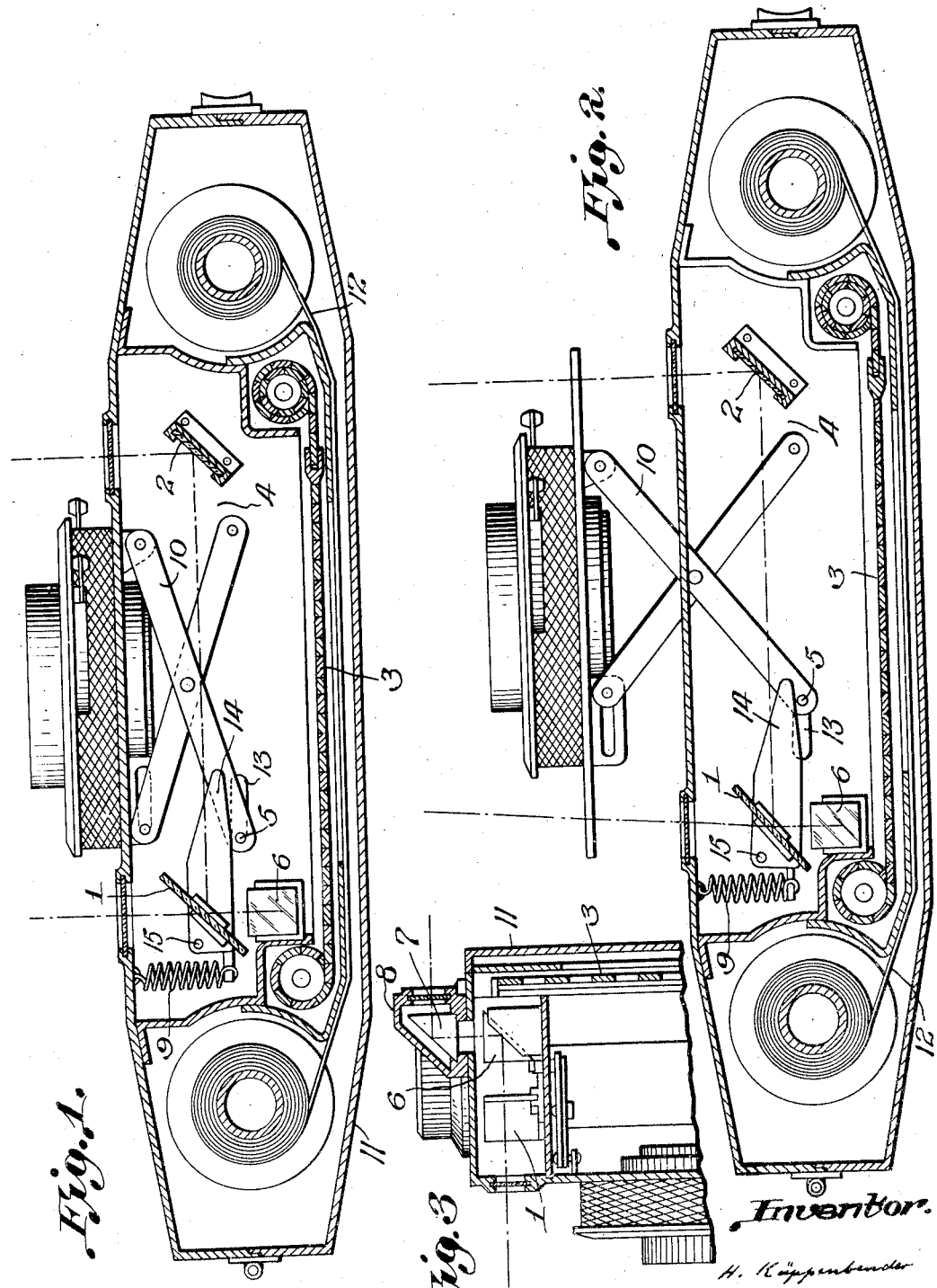

2,065,335

UNITED STATES PATENT OFFICE 2,065,335

COMBINED PHOTOGRAPHIC CAMERA AND DISTANCE METER

Heinz Küppenbender, Dresden-Strehlen, Germany, assignor to Zeiss Ikon Aktiengesellschaft Dresden, Dresden, Germany Application March 1, 1934, Serial No. 713,471
In Germany May 28, 1932

2 Claims. (Cl. 95—44)

With photographic cameras with slotted shutter the housing of a distance meter, especially a basis distance meter, is difficult for the reason that the shutter occupies nearly the entire breadth of the camera whereby placing the peeping axis of the distance meter into the space enclosed by the shutter is prevented. One is, therefore, generally compelled to arrange the distance meter above the slotted shutter which entails a disagreeable broadening of the camera casing. Also with cameras in which the rear wall can be completely detached, looking through is not possible without particular provisions, as the necessity arises to make an opening in the rear wall and, perhaps, to support a part of the optical viewing system in said wall itself. Both contrivances are disadvantageous.

Now, in order to utilize the space existing in most cases in front of the curtain, the distance meter itself, is, according to this invention, arranged in said space, but the rays passing from the semi-transparent silvered mirror of the distance meter into the eye of the observer are deflected by optical means, for instance by prisms, in such a manner that the view aperture of the distance meter gets located over the slotted shutter, or over the casing of the camera respectively. In this way the entire distance meter is located hidden in the camera, and solely a small cap bearing a part of the deflecting members projects forth from the casing of the camera. This projecting cap need not be higher than the buttons projecting forth from said casing on the same side and serving for the actuation of the film feeding means and for tensioning the shutter spring. Controlling the distance meter arranged in that manner can be effected in known manner by the props of the camera.

The improved arrangement presents, first of all, the advantage that the object to be photographed can be viewed from the rear side of the camera.

The invention is illustrated diagrammatically and by way of example on the accompanying drawing on which Fig. 1 is a longitudinal section through the camera.

Fig. 2 is a section similar to Fig. 1, the lens being drawn out.

Fig. 3 is a part vertical section on line III—III of Fig. 1.

On the drawing, 1 and 2 (Fig. 1) denote the mirrors which are arranged in the space 4 containing also the slotted shutter 3. The mirror 1 is semi-transparent and silvered; it is movable and spring-actuated (9, Fig. 1, denotes the spring) and operated by the intermediary of the camera props 10 (shown in dotted lines in Figs. 1 and 2) when the camera is adjusted. The deflection of the rays from the mirror 1 is effected in this example by two prisms 6 and 7 (Figs. 1 and 3) refracting the rays twice, each time by 90°. A cap 8 provided on the casing 11 of the camera serves for the protection of the prism 7.

The means for adjusting the mirror are as follows:—

If the camera is adjusted to "indefinite" the mirror 1 and its carrier 14 pivotable around bolt 15 are in the position shown in Fig. 1. The pin 5 on prop 10 bears then against the straight edge of the carrier 14. If the camera is adjusted to a closer object, i. e. if the lens is removed from the plane of the film, pin 5 of prop 10 slides in the slot of a guide pin 13. The spring 9 pulls the mirror carrier 14 against pin 5, so that this carrier and with the same the mirror is oscillated and the measuring ray deflected.

I claim:

1. In a photographic camera in combination with the camera casing the lens and the lens props, said casing having two apertures in its front wall one on each side of the lens and an aperture in its top wall, a distance meter in said casing, comprising a semi-transparent mirror behind one of said apertures in the front wall of the casing, an oscillatably mounted spring controlled carrier of said semi-transparent mirror adapted to be oscillated from the corresponding prop of the lens when said carrier is being adjusted, a fixed mirror arranged behind the other of the apertures in the front wall of the casing and adapted to reflect the beam of light from its aperture on to said semi-transparent mirror, a prism in the axis of and behind said semi-transparent mirror adapted to project the rays from said semi-transparent mirror through the aperture in the top wall of said casing, and a prism above the aperture in the top wall of the camera.

2. In a photographic camera in combination with the camera casing the lens and the lens props, said casing having two apertures in its front wall one on each side of the lens and an aperture in its top wall, a distance meter in said casing, comprising a semi-transparent mirror behind one of said apertures in the front wall of the casing, an oscillatably mounted spring controlled carrier of said semi-transparent mirror adapted to be oscillated from the corresponding prop of the lens when said carrier is being adjusted, a fixed mirror arranged behind the other of the apertures in the front wall of the casing and adapted to reflect the beam of light from its aperture on to said semi-transparent mirror, a prism in the axis of and behind said semi-transparent mirror adapted to project the rays from said semi-transparent mirror through the aperture in the top wall of said casing, a second prism above the aperture in the top wall of the camera adapted to deflect the rays deflected by said first prism towards the rear of the camera, and a cap on the top wall of the camera adapted to protect said second prism.

HEINZ KÜPPENBENDER.